United States Patent
Vaysse et al.

(10) Patent No.: US 9,121,728 B2
(45) Date of Patent: Sep. 1, 2015

(54) LINEAR POSITION SENSOR

(75) Inventors: Bertrand Vaysse, Tournefeuille (FR); Jérémie Blanc, Aussonne (FR); Alain Fontanet, Muret (FR); Jean-Louis Roux, Brax (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 434 days.

(21) Appl. No.: 13/497,125

(22) PCT Filed: Sep. 29, 2010

(86) PCT No.: PCT/EP2010/005933
§ 371 (c)(1),
(2), (4) Date: May 18, 2012

(87) PCT Pub. No.: WO2011/038893
PCT Pub. Date: Apr. 7, 2011

(65) Prior Publication Data
US 2012/0223701 A1    Sep. 6, 2012

Related U.S. Application Data

(60) Provisional application No. 61/248,074, filed on Oct. 2, 2009, provisional application No. 61/248,066, filed on Oct. 2, 2009.

(51) Int. Cl.
*G01R 33/06* (2006.01)
*G01D 5/20* (2006.01)

(52) U.S. Cl.
CPC .................................... *G01D 5/204* (2013.01)

(58) Field of Classification Search
CPC ......... G01D 5/204; G01D 5/202; G01B 7/003
USPC ..................................................... 324/207.16
See application file for complete search history.

(56) References Cited

U.S. PATENT DOCUMENTS

| 4,401,986 A | 8/1983 | Trenkler et al. |
| 4,507,638 A * | 3/1985 | Brosh ............................. 336/79 |

(Continued)

FOREIGN PATENT DOCUMENTS

| CN | 101253390 A | 8/2008 |
| EP | 0 182 085 B1 | 5/1986 |

(Continued)

OTHER PUBLICATIONS

International Search Report, dated Sep. 23, 2011, from corresponding PCT application.

*Primary Examiner* — Tung X Nguyen
*Assistant Examiner* — Alesa Allgood
(74) *Attorney, Agent, or Firm* — Young & Thompson

(57) ABSTRACT

A device for measuring the position of a target includes a track, which includes a primary winding (513) supplied with an alternating current at high frequency, and a plurality of secondary windings (511, 512). The device measures the position of the leading edge (510) of the target (500) in a so-called longitudinal direction (5000) between a first position and a second position between which the target (500) completely covers the track (550). Surprisingly, this configuration enables a very significant increase in the useful measurement length of such a track (550).

9 Claims, 4 Drawing Sheets

(56) References Cited

U.S. PATENT DOCUMENTS 5,339,029 A * 8/1994 Wagner .................. 324/207.17
6,518,752 B1 * 2/2003 Wyss ...................... 324/207.25
7,449,878 B2   11/2008 Lee
7,791,331 B2   9/2010 Servel

FOREIGN PATENT DOCUMENTS

| FR | 2 803 030 A1 | 6/2001 |
| FR | 2 881 823 A1 | 8/2006 |
| GB | 2 012 431 A | 7/1979 |

* cited by examiner

LINEAR POSITION SENSOR

The field of the invention is that of position sensors and the invention concerns a contactless linear position sensor. These sensors deliver a signal substantially proportional to the position of a target over a measurement area. In the case of the invention, this measurement extent is said to be linear, i.e. the sensor delivers position information for only one coordinate in space, which coordinate may be cartesian or polar, in which latter case the sensor is referred to as a circular sensor or "resolver". Hereinafter, the expression "linear sensor" designates any type of sensor delivering position information for only one coordinate, whether the movement of the target is rectilinear or rotary.

This type of sensor finds very many industrial applications wherever it is necessary to define the position of a mechanical element: there may be cited the measurement rules of machine tools, selector lever position sensors in automobiles, gas lever position sensors or flap control sensors in aeronautics and shipbuilding, although this list is not exhaustive.

The invention concerns more particularly the field of so-called inductive sensors. This type of sensor is known to the person skilled in the art and only those elements necessary for understanding the advantages of the invention are described hereinafter.

The expression "winding" designates any looped pattern described by an electrical conductor. The winding may describe these loops in a helical trajectory around an axis or spiral trajectories on a plane or a repetitive pattern lying in one or more parallel planes. INDUCTOSYN® sensors and the sensors described in European patent EP 0182085 are examples of inductive sensors. All these sensors have in common measuring the movement of a target and including a primary winding supplied with an alternating current at high frequency which induces a voltage in a secondary winding. The movement of the target modifies the coupling between the primary winding and the secondary winding, the position of which is deduced from the measured voltage at the terminals of the secondary winding.

EP 0182085 describes a position sensor in which the primary winding and the secondary winding are placed on a track. FIG. 1 represents diagrammatically the constitution of such a sensor. The target is constituted of an electrically conductive material and is moved relative to the two windings. In FIG. 1A, in a simple embodiment, the track (100) comprises a primary winding (10) which is supplied with an alternating current at high frequency, generally in the range from a few KHz to a few MHz, and a secondary winding (11). In this example, the secondary winding (11) comprises two loops (110, 111). Compared to the direction of the current (15) the winding directions of the loops (110, 111) of the secondary winding are reversed so that the voltages induced in these loops by the current (15) flowing in the primary winding (10) are equal in amplitude but opposite in polarity. In the absence of any target, the voltages in the two loops (110, 111) of the secondary winding (11) balance out and the voltage measured at the terminals of the winding is a null voltage. In FIG. 1B, in the presence of a target (200) constituted of an electrically conductive material, the magnetic field produced by the current (15) flowing in the primary winding (10) induces in the target (200) an electrical field which, in turn, produces a current density that generates a magnetic field that opposes the magnetic field generated by the primary winding (10).

In FIG. 1B, when such a target (200) is moved relative to the track, the amplitude of the voltage measured at the terminals of the secondary winding varies as a function of the difference between the areas covered by the target (200) on each of the loops (110, 111). In the FIG. 1B example, the target (200) as it moves first progressively covers the first loop (110) of the secondary winding (11) and then the second loop (111) of that winding. Initially (position I) the target covers neither of the loops and the amplitude of the voltage measured at the terminals of the secondary winding is a null amplitude, the voltages in the two loops balancing out. In this embodiment, the loops (110, 111) follow a crenellated geometrical pattern on the surface of the track and the target (200) is of rectangular shape, its length being substantially equivalent to the pitch of said crenellations. Accordingly, when the target covers all of the first loop (110) of the secondary winding (11), the amplitude of the voltage at the terminals of the latter winding is equivalent to that of the voltage induced in the second loop (111). When the target (200) covers equal areas of the two loops (110, 111) (position II) the amplitude of the voltage measured at the terminals of the secondary winding is a null voltage. Then when the target (200) completely covers the second loop (111) the amplitude of the voltage measured at the terminals of the secondary winding (11) is equivalent to that of the voltage induced in the first loop (110). Finally (position III), the amplitude of the voltage measured at the terminals of the secondary winding (11) tends again toward zero when the target (200) no longer covers the second loop (111) and the voltages in the two loops balance out again.

By demodulating the voltage measured at the terminals of the secondary winding a sensor of this kind delivers a theoretical signal (103) for the evolution of the voltage (102) between −V and +V as a function of the movement of the target (200), the variation of which is a function of the area of the secondary winding covered by the target (200). In this embodiment, in which the loops describe crenellations and the target is of rectangular shape, this theoretical function (103) is linear. However, the real response (104) departs significantly from this theoretical function. Accordingly, at the ends, when the target covers only one loop of the secondary winding, the variation in the amplitude of the voltage measured at the terminals of this winding differs from the variation seen when the target (200) partly covers the two loops of the winding. Moreover, edge effects rule out the use of the extreme positions (positions I and III), with the result that the range (130) of use of such a sensor, over which range the signal may be interpreted, is a function of the intended accuracy but of the order of half the length of the track.

This overall size, significantly greater than the range of measurement, causes problems in integrating such a sensor.

To limit this drawback it is known in the prior art to multiply the number of secondary windings and to optimize the shape thereof, notably with the aid of simulation tools.

By way of example, FIG. 2, also relating to the prior art, shows an embodiment comprising two spatially out of phase secondary windings (211, 212). By reducing the pitch of the loops and combining the measurements of the voltages at the terminals of the two windings, this configuration enables reduction of the relative importance of the edge effects and an increase in the useful measurement range (230). Nevertheless, the real signals (204, 204') differ from the theoretical signals (203, 203'), on the one hand at the ends, because of the edge effects referred to above, but also each time that there is a transition between a situation in which the target (200) covers only one loop of a secondary winding and a situation in which the target covers two loops thereof and vice versa. Indeed, the variation (204, 204') of the voltage in these areas is sensitive to the geometrical shape of the connection between the loops. Accordingly, in this prior art solution, the increase in the useful measurement range (230) which remains modest, of the order of 10 to 20%, is reflected in additional sensor manufacturing costs, the shape of the windings and the methods for producing them becoming more complex, and/or is accompanied by a reduction in the accuracy of the sensor because of transition phenomena at the connections between the loops.

The invention aims to solve the problems of the prior art and notably to increase the useful range of measurement of these sensors for a given overall size, economically and without losing the advantages resulting from the constitution of these prior art sensors, notably the absence of measurement and power supply electrical connections to the mobile target.

To this end, the invention proposes a device for measuring the position of a target in a longitudinal direction, which device comprises:

- a track extending along a longitudinal axis parallel to the measurement direction, which track comprises a primary winding adapted to induce an electrical current in a secondary winding that is organized in accordance with a periodic geometry so as to cover the area of the track by at least two winding loops over the length of the latter track;
- a target comprising a leading edge mobile longitudinally relative to the track and superposed thereon between a first point and a second point delimiting a measurement amplitude and able, between these two points, to modify the current induced by the primary winding in the secondary winding;
- so that the target extends in the longitudinal direction from its leading edge and that during relative movement of the target between the first point and the second point the track area covered by the target is strictly increasing.

This configuration delivers a signal, the shape of which is similar to a sinusoid, whatever the periodic geometrical pattern of the secondary winding is. Determining the position of the target from this sinusoidal response enables a very significant increase in the useful measurement length of such a track over which the signal may be interpreted with given accuracy. For example, using the same prior art track as described in EP 0182085, but replacing the prior art target with a target as proposed by the invention, the useful measurement length is increased in the range 50 to 80% without loss of either resolution or measurement accuracy.

The present invention may be implemented in various embodiments described hereinafter that may be considered individually or in any technically feasible combination.

The invention is not limited to rectilinear tracks and the longitudinal axis of the track may advantageously be a circular axis, so that the device may be used to constitute a resolver.

The only condition imposed on the nature of the target is that it must be constituted of an electrically conductive material. The target may thus be constituted of any metal, whether ferromagnetic or paramagnetic, such as steel, including austenitic stainless steel, or aluminum alloy.

The track is advantageously constituted by a printed circuit, which enables a compact constitution thereof.

In a preferred embodiment, the device comprises two secondary windings. Without being tied to any particular theory, it is thought that the effect of the target covering the track is similar to an integration, the effect of which is to smooth the variations of the signal, notably at the transitions between the loops. This effect solves the problems of the prior art linked to the transitions between the loops and enables all the advantages of the increased number of secondary windings to be obtained.

The two secondary windings are advantageously organized with two periodic distributions of the loops on the surface of the track spatially out of phase by one quarter-period. Thus the signals delivered by each winding after demodulation of the voltages measured at their respective terminals follow, as a function of the movements of the target, functions similar to a sine and a cosine, the ratio of which is easy for electronic or computer means to calculate, followed by the arc-tangent, so as to obtain a quasi-linear signal as a function of the relative position of the leading edge of the target on the length of the track within a given range.

In an advantageous variant, the leading edge of the target is inclined at an angle $\alpha$ relative to an axis parallel to the surface of the target and perpendicular to the longitudinal axis thereof. This feature makes the covering of the track by the target more progressive and the signal obtained is closer to a sinusoidal function, whatever the geometrical shape of the periodic winding loops is and notably improves the shape of the signal at the transitions between the loops.

This embodiment of the invention is particularly suitable for producing sensors able to measure the position of an automatic gearbox selector lever, the target being constituted of the "coxcomb" for indexing the lever. Thus the lever indexing device, called the "coxcomb", is advantageously used as a target enabling considerable simplification of the construction of the sensor by avoiding the addition of a specific target.

In one particular embodiment of the device of the invention, the quality of the signal obtained is the optimum when the periodic geometry of the loops of the secondary winding describes a sinusoidal function on the surface of the track.

The invention also concerns a method for measuring the position of a target using a device of the invention in an embodiment comprising two secondary windings, the periodic geometry whereof is spatially out of phase by a quarter-period, which method comprises the steps of:

a. measuring the voltage at the terminals of a first secondary winding and a second secondary winding, b. delivering a first signal proportional to the ratio between the amplitude of the alternating current voltage at the terminals of the first secondary winding and the amplitude of the alternating current voltage at the terminals of the second secondary winding, c. delivering a second measurement proportional to the arc-tangent function of the value of the ratio represented by the first measurement.

The signal representing the arc-tangent function may then be conditioned to produce a linear signal proportional to the relative position of the leading edge of the target on the useful length of the track.

The invention will now be described in more detail in the context of preferred, nonlimiting embodiments, and with reference to FIGS. 1 to 8, in which:

FIG. 1, relating to the prior art, represents a device for measuring the position of a target as seen from above, showing in FIG. 1A a track example comprising one primary winding and one secondary winding of crenellated periodic geometry and in FIG. 1B a diagrammatic embodiment using such a track and a rectangular target together with the theoretical and practical output signals of such a sensor;

FIG. 2, also relating to the prior art, shows from above an embodiment comprising a track including two secondary windings and the theoretical and practical signals delivered by such a sensor as a function of the position of the target;

FIG. 3 shows from above an embodiment of the invention comprising a track including two secondary windings:

FIG. 3A showing the target being situated at one end of the useful range of measurement of the track, FIG. 3B showing the target being situated at the other end of the useful measurement range, and FIG. 3C showing the theoretical signals obtained at the terminals of the two secondary windings, FIG. 4 is a plan view of a particular embodiment of the device of the invention in which the leading edge of the target is inclined at an angle α;

Figure 7:
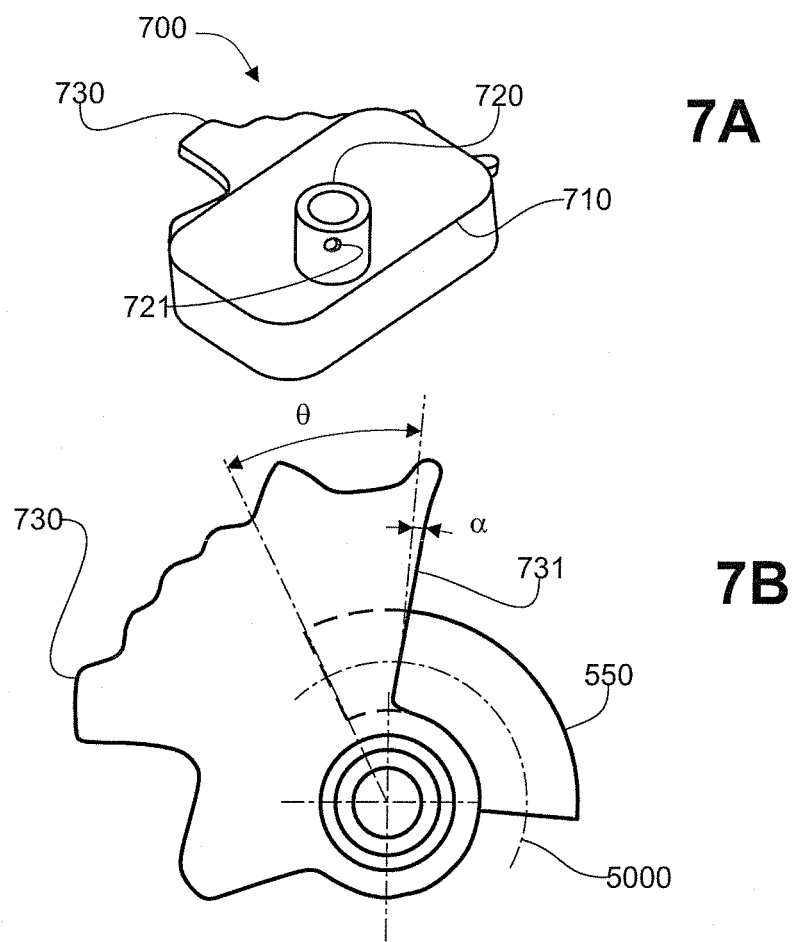
FIG. 7 shows an embodiment of an automatic gearbox position sensor incorporating a device of one of the embodiments of the invention.
Figure 8:
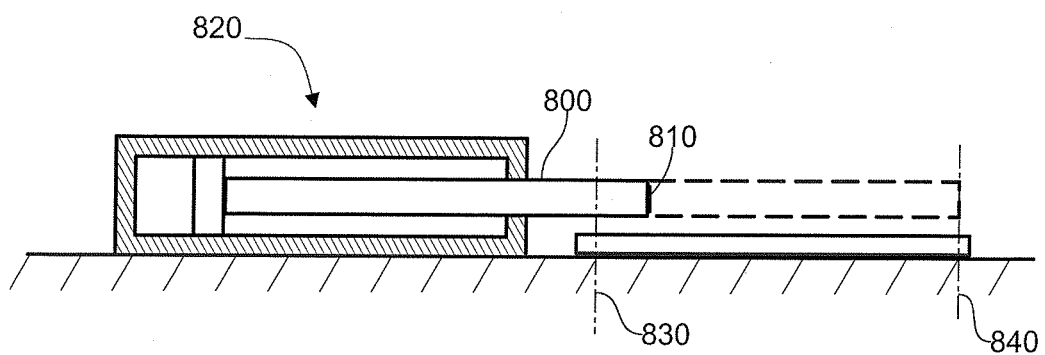

FIG. 7A showing diagrammatically the sensor in a general perspective view from above, FIG. 7B showing from above the lay-out of the measuring track and the target in this sensor, and FIG. 8 shows from the side an example of use of a device of one embodiment of the invention for measuring the position of a piston rod.

Figure 1:
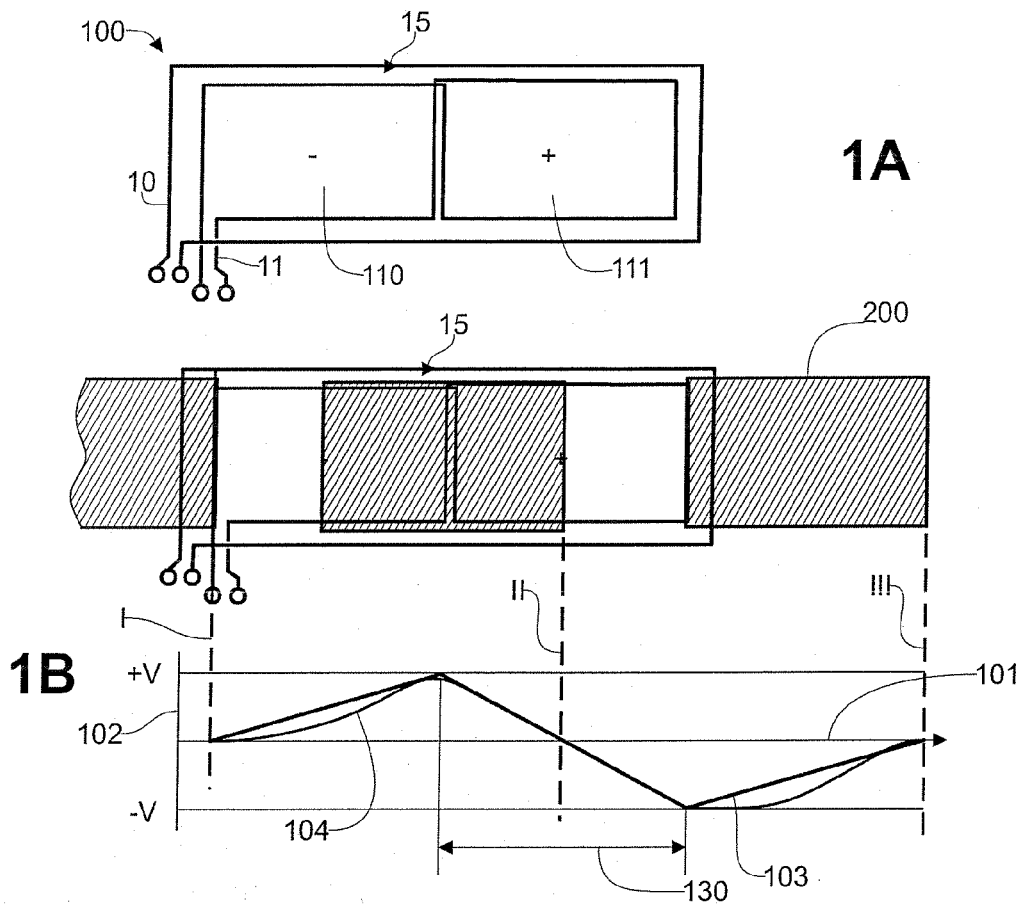
Figure 2:
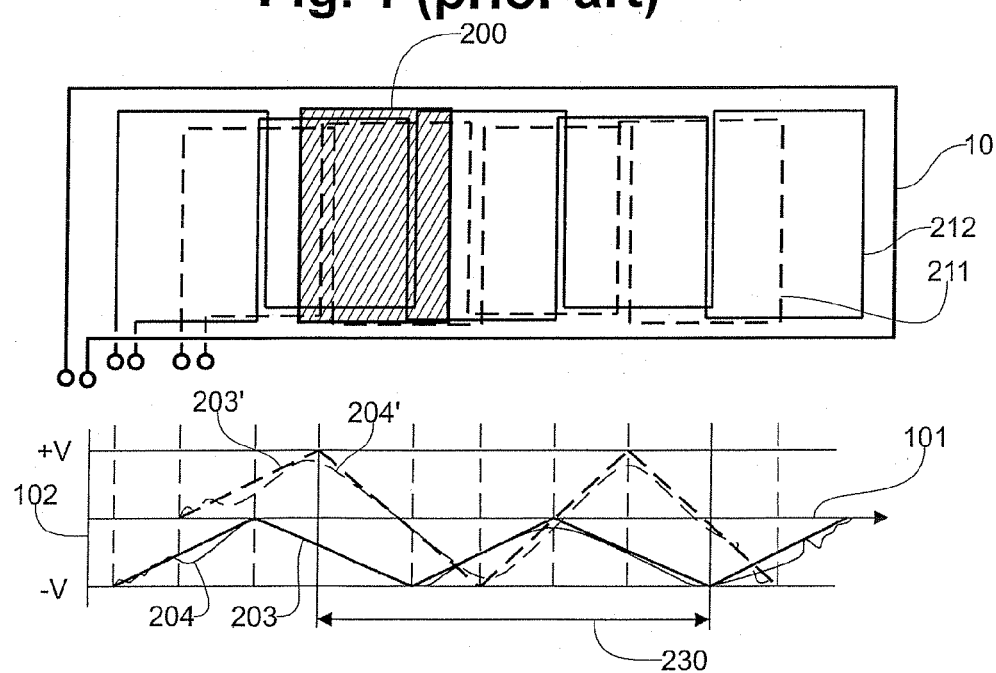
Figure 3:
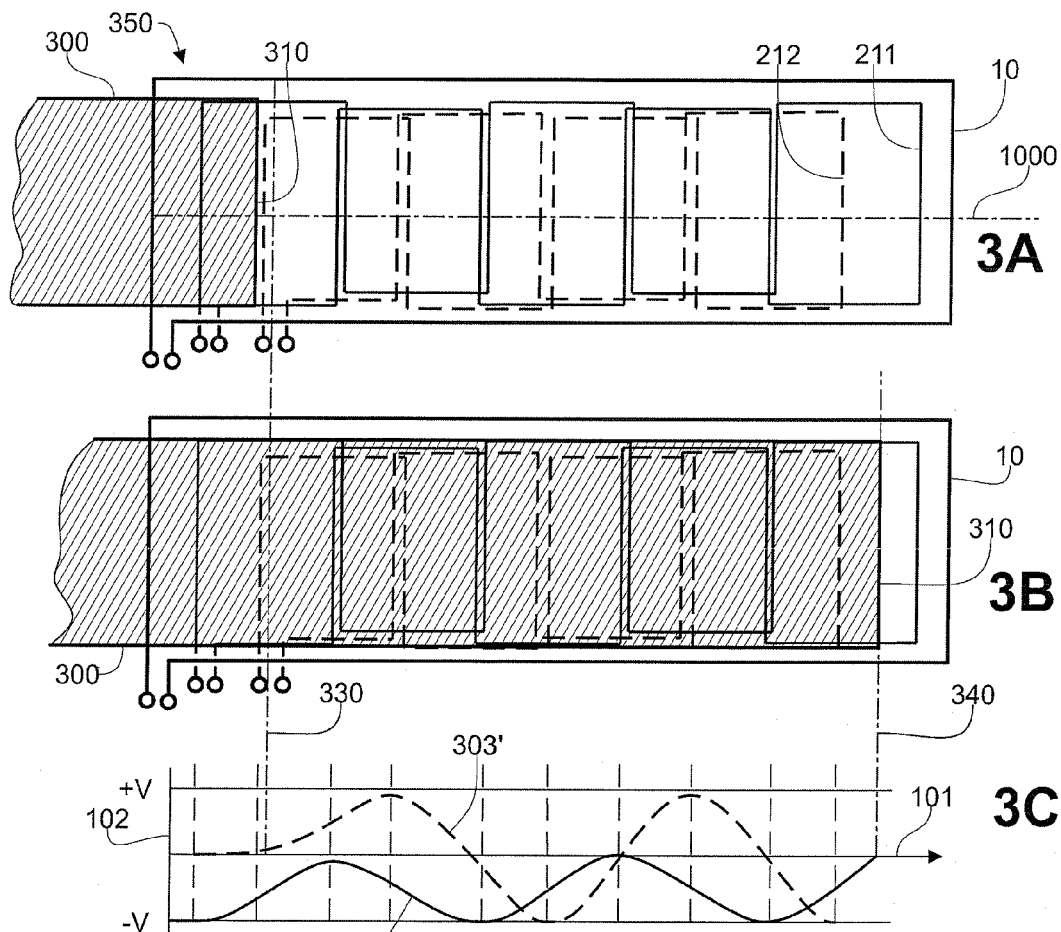

In FIG. 3A, in one embodiment, the device of the invention comprises a track 350 extending along a longitudinal axis 1000, which includes a primary winding 10 and two secondary windings 211, 212 describing loops according to out of phase periodic patterns inside the primary winding 10. The device includes a target 300 including a leading edge 310. The target 300 also extends along the longitudinal axis 1000 and its width is preferably substantially equal to that of the track, of which it covers in the widthwise direction the loops of the secondary windings 211, 212. The surface of the target 300 is preferably substantially parallel to the surface of the track. In this embodiment, the track is plane. The target is constituted of an electrically conductive material, preferably a metal, so that the magnetic field induced by the circulation of the electrical current in the primary winding 10 is able to induce a magnetic field in the target 300. The target has only one leading edge, situated at its end facing the track 35.

The device further includes means (not shown) for supplying the primary winding with an alternating current at high frequency, means (not shown) able to measure the voltage at the terminals of the secondary windings 211, 212, and signal processing means, not shown, able to carry out operations on the signals measured at the terminals of the secondary windings.

The device preferably includes means (not shown) for guiding relative movement between the target 300 and the track 350 in a longitudinal direction 1000 parallel to the surface of the track 350. This movement is done without contact between the target 300 and the track 350, the distance between the facing surfaces of the target 300 and the track 350 being kept substantially constant during this movement by the guide means.

In FIG. 3B, the target 300 of the invention has a length at least equal to the intended measurement amplitude so that when relative movement between the target 300 and the track 350 brings the leading edge 310 of the target from a relative position 330 at one end of the useful range of measurement of the track 350 to the other end 340 of that range, the area of the track 350 covered by the target 300 is strictly increasing. The distance between these two positions 330, 340 of the target relative to the track defines the measurement amplitude of the sensor. The target 300 facing the track 300 has a closed surface without any opening over the area between the two end points 330, 340 of the measurement amplitude.

In FIG. 3C, between these two points 330, 340, the signals 303, 303' corresponding to the amplitude 102 of the voltage measured at the terminals of the two secondary windings 211, 212 follow a substantially sinusoidal function as a function of the relative position 101 of the leading edge 310 of the target 300. The two signals 303, 303' corresponding to the two secondary windings 211, 212 are out of phase and this phase difference in the sinusoids reflects the phase difference of the periodic repetition patterns of the loops of the two secondary windings 211, 212 on the surface of the track 350. Thus if the loops of the two windings follow periodic patterns spatially out of phase by a quarter-period, the signals 303, 303' delivered by these windings as a function of the relative position of the target 300 on the longitudinal axis 1000 of the track may be treated as a sine and a cosine.

For a given track, this configuration makes it possible to increase considerably the useful length of the latter track, for equivalent accuracy and linearity. Thus a prior art movement sensor as described in EP 0182085, including a track 28 mm long, enables measurement of the position of a target over a movement amplitude of 14 mm. By optimizing the windings to minimize edge effects, the measurable length reaches 16 mm. Using the target configuration described herein, the useful length of measurement for the same track reaches 25 mm.

Figure 4:
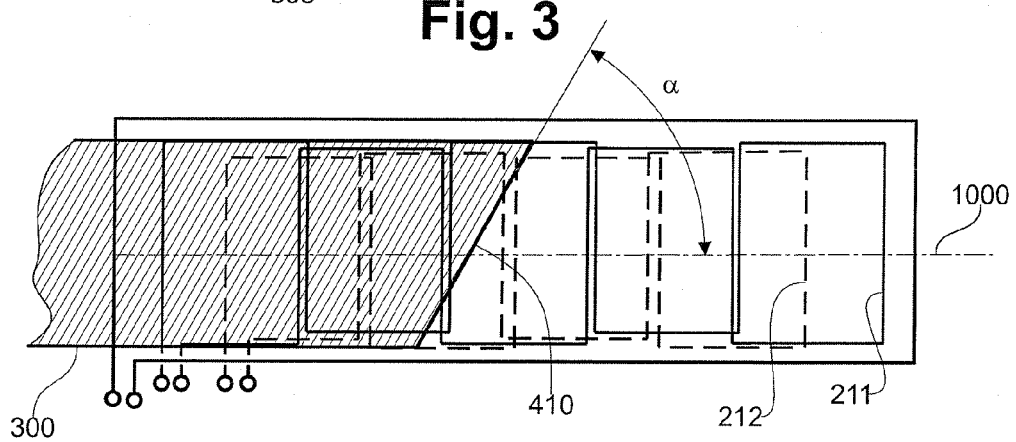

In FIG. 4, in an advantageous embodiment, the leading edge 410 of the target 300 is inclined at an angle α relative to a direction perpendicular to the longitudinal direction 1000.

Figure 5:
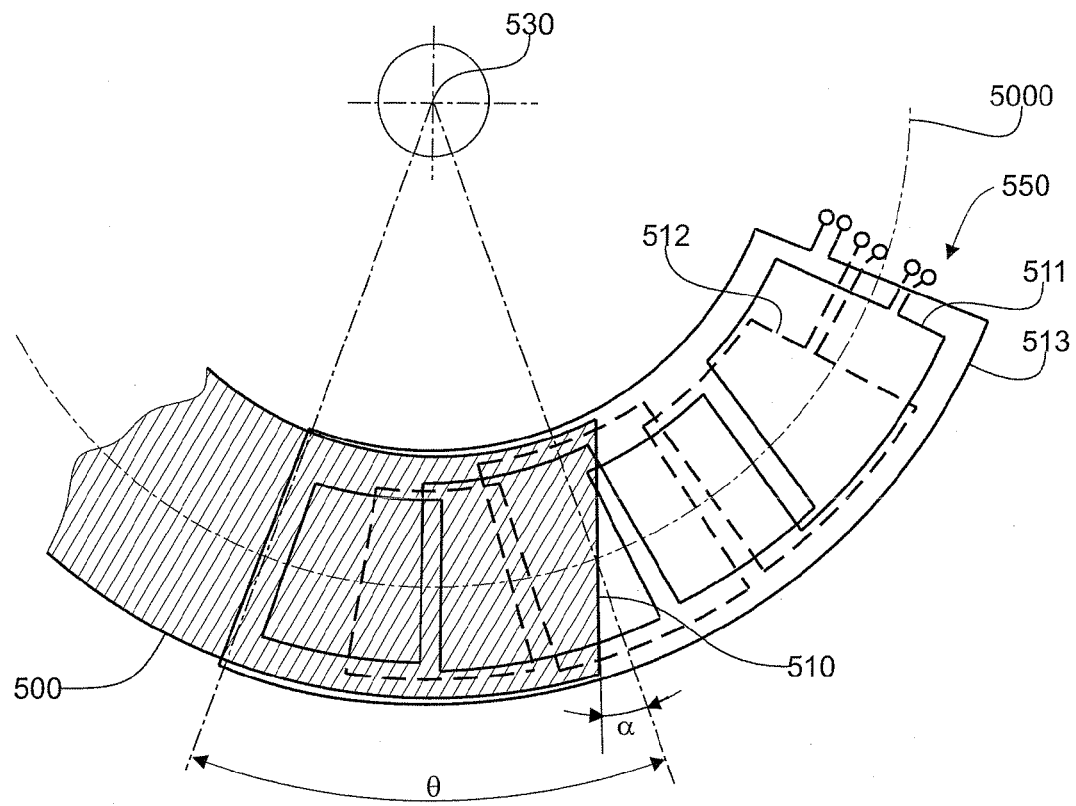
FIG. 5 shows from above an embodiment of the device of the invention in which the track follows a circular trajectory relative to the track.

In FIG. 5, in one embodiment, the device of the invention may be configured to constitute a resolver. In one example of this configuration, the track 550 extends along a circular axis 5000 and as before comprises a primary winding 513 surrounding two secondary windings 511, 512, the loops whereof describe periodic geometrical patterns preferably out of phase by a quarter-period along the axis 5000, referred to as the longitudinal axis, which here is a circular axis. The target 500 is also circular and includes a leading edge 510 preferably inclined at an angle α relative to the radial direction. Means, not shown, guide circular relative movement concentric with the longitudinal axis 5000 about a common axis 530. The signals delivered by the secondary windings 511, 512 during the relative rotation of the target 500 and the track 550 enable determination of the relative position θ of the target 500 with respect to the track.

Figure 6:
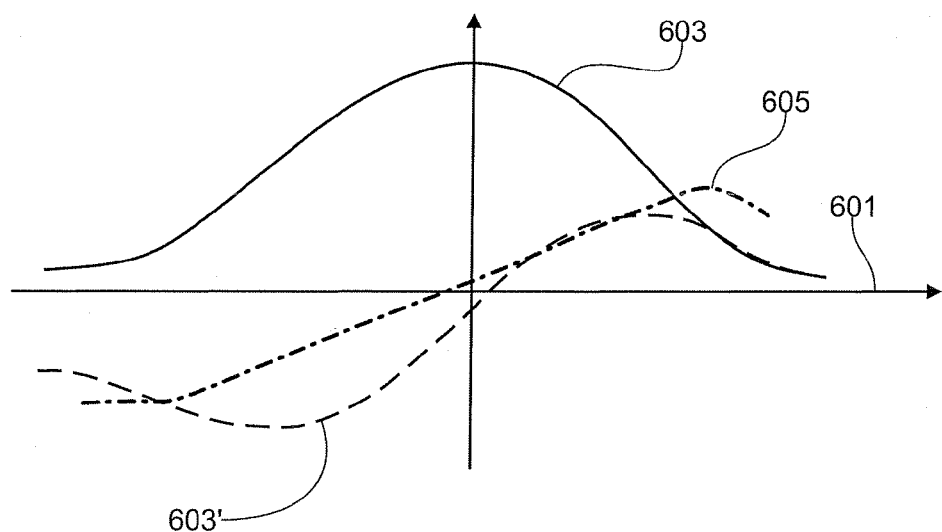
FIG. 6 shows diagrammatically the shape of the signals at the terminals of each secondary winding as a function of the angular position θ of the target and the arc-tangent function calculated from those signals.

In an advantageous embodiment, the loops of the secondary windings 511, 512 of the circular track 550 follow periodic patterns out of phase by a quarter-period with an angular coordinate θ. In this embodiment, see FIG. 6, the signals coming from these secondary windings 511, 512 follow, as a function of the position θ 601 of the target 500, evolutions similar to a sine 603' and a cosine 603. By calculating the ratio of these two signals 603', 603 and by calculating the arc-tangent function of this ratio, a signal 605 is obtained as a function of the angular position 601 relative of the target 500 relative to the track 550 that is quasi-linear.

The ratio between the signals and the arc-tangent function may be calculated by electronic circuits integrated into the device.

This example is described in the situation of a resolver, but the arc-tangent signal may be conditioned to correspond to a cartesian coordinate or an angular coordinate giving the physical position of the leading edge 310, 410, 510 of the target. This conditioning/calibration may equally well be effected by an electronic circuit integrated into the device, the calibration data being stored in an EEPROM.

In FIG. 7, in an example of application of the device of the invention, the latter device is used to constitute a sensor for the position of an automatic gearbox selector lever.

In FIG. 7A, in one embodiment, such a sensor 700 is constituted of a casing 710 fixed relative to said selector lever, a rotary hub 720 comprising means 721 for connecting it in rotation to the selector lever. An indexing device comprising a ratchet 730 commonly called a "coxcomb" is connected to the hub 720 and, in cooperation with a ratchet (not shown) enables indexing of the position of the selector lever. These positions of the selector lever correspond to automatic gearbox settings such as "parking", "forward", "reverse", "neutral", etc. Electronic driving aids need to know the position of the selector lever to refine the conditions of driving the vehicle. In the prior art, a specific sensor using a magnetic target is fixed to the hub and positioned relative to the ratchet 730 to determine its position.

In FIG. 7B, using the device of the invention, the ratchet 730 may be used as a target, its angular position along an axis 5000 being measured by a circular track 550 connected to the casing 710 and fixed relative to the hub 720. Thus the number of sensor parts is reduced compared to the prior art and its assembly simplified, notably because of the absence of positioning of the target relative to the ratchet 730, which makes the mass production of such a sensor more economic, at the same time as improving its reliability. Note that the leading edge 731 of the ratchet may advantageously be inclined at an angle α relative to the radial direction.

In FIG. 8, in one application example, the device of the invention may, in one of these particular embodiments, be used to measure directly the position of the piston rod 800 of a cylinder 820. In this configuration, the piston rod 800 serves directly as the target, the length of the track being substantially equal to the stroke of the rod between its extreme positions 830, 840.

The above description shows clearly that by its various features and the advantages thereof the present invention achieves the stated objectives. In particular, it enables a very significant increase in the measurement amplitude of an inductive sensor of equivalent overall size compared to the prior art.

The invention claimed is:

1. A device for measuring the position of a target constituted of an electrically conductive material in a longitudinal direction, which device comprises:
    a track extending along a longitudinal axis parallel to the measurement direction, which track comprises a primary winding adapted to induce an electrical current in a secondary winding that is organized in accordance with a periodic geometry so as to cover the area of the track by at least two winding loops over the length of the latter track;
    a target comprising a leading edge, mobile longitudinally relative to the track and superposed thereon between a first point and a second point delimiting a measurement amplitude and able, between these two points, to modify the current induced by the primary winding in the secondary winding;
    the target extending in the longitudinal direction from its leading edge, and
    during relative movement of the target between the first point and the second point the track area covered by the target being strictly increasing,
    characterized in that:
    the leading edge of the target is inclined at a non-zero angle α, in a plane of the surface of the target, relative to an axis that is parallel to the surface of the target and perpendicular to the longitudinal axis thereof.

2. The device as claimed in claim 1, characterized in that the longitudinal axis of the track is a circular axis.

3. The device as claimed in claim 1, characterized in that the target is constituted of a paramagnetic material.

4. The device as claimed in claim 1, characterized in that the track is constituted by a printed circuit.

5. The device as claimed in claim 1, characterized in that the periodic geometry of the loops of the secondary winding describes a sinusoidal function on the surface of the track.

6. The device as claimed in claim 1 further comprising a sensor for measuring the position of an automatic gearbox selector lever, the target being constituted by the "coxcomb" for indexing the lever.

7. The device as claimed in claim 1, characterized in that it includes two secondary windings.

8. The device as claimed in claim 7, characterized in that the two secondary windings are organized in accordance with two periodic distributions of the loops on the surface of the track spatially out of phase by a quarter-period.

9. A method for measuring the position of a target using a device for measuring the position of a target constituted of an electrically conductive material in a longitudinal direction, said method comprising:
    a. measuring a voltage at terminals of each a first secondary winding and a second secondary winding,
    b. delivering a first signal proportional to a ratio between the amplitude of the alternating current voltage at the terminals of the first secondary winding and the amplitude of the alternating current voltage at the terminals of the second secondary winding,
    c. delivering a second signal proportional to an arc-tangent function of a value of the first signal;
    wherein the device comprises a target comprising a leading edge, mobile longitudinally relative to the track, that is inclined at a non-zero angle α, in a plane of the surface of the target, relative to an axis parallel to the surface of the target and perpendicular to the longitudinal axis thereof.

* * * * *